Patented Mar. 15, 1932

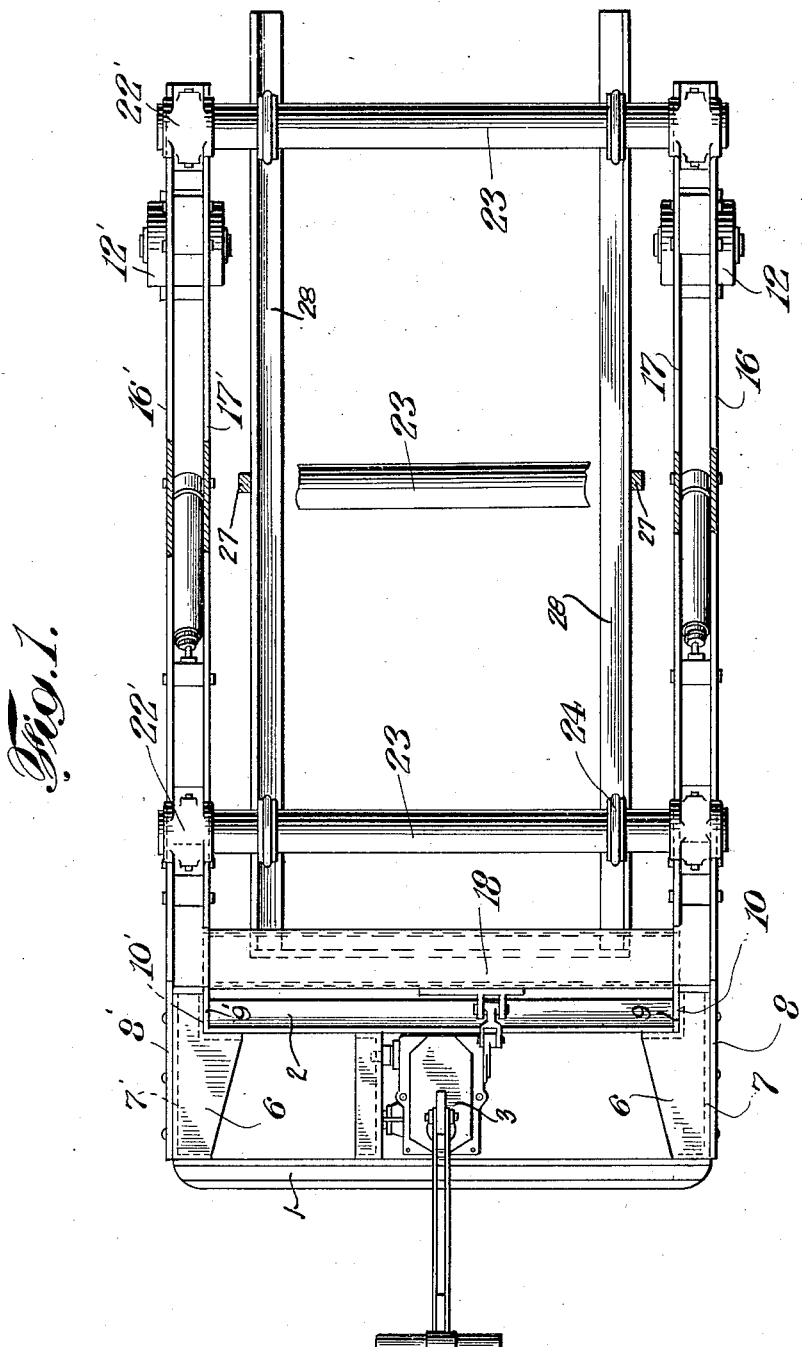

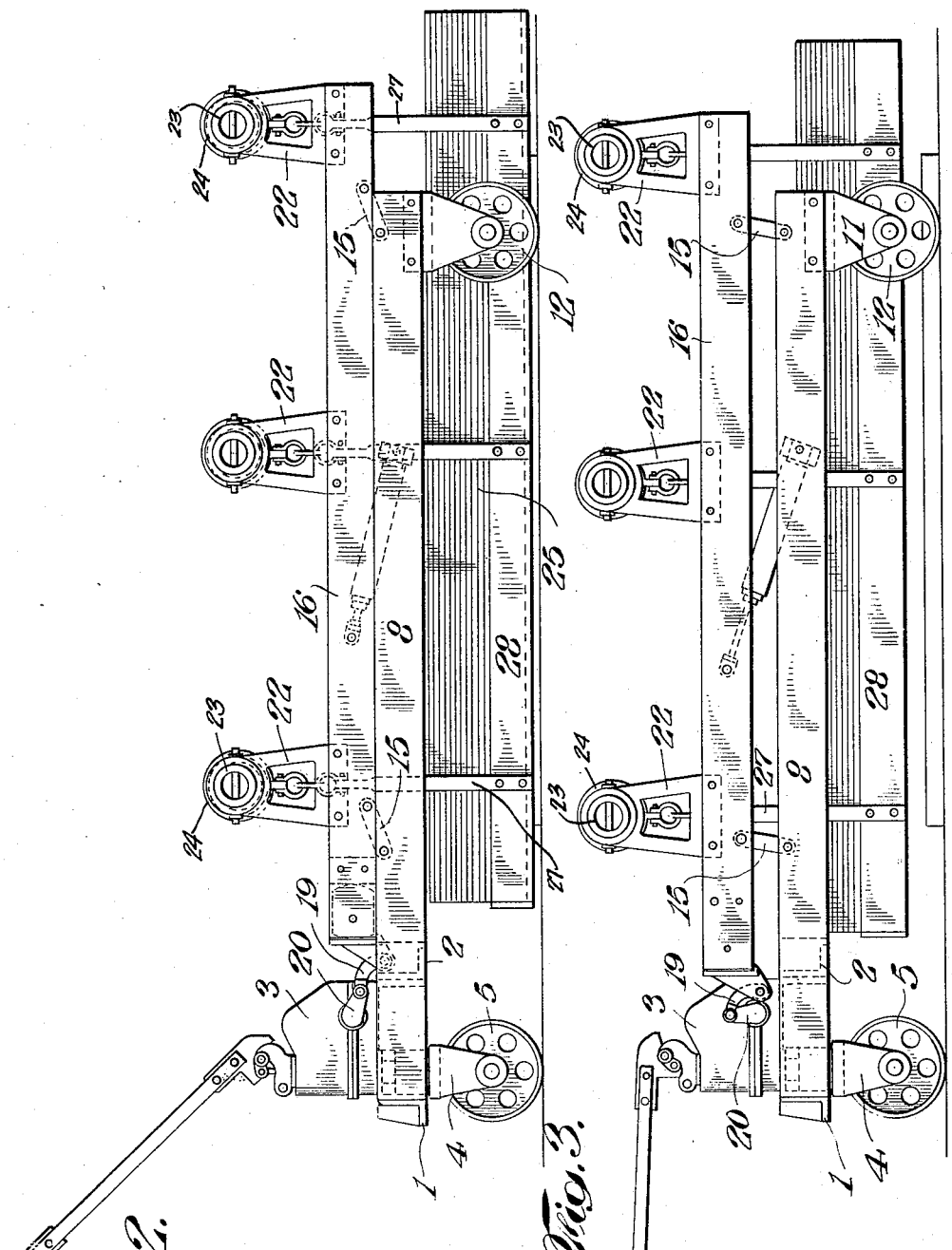

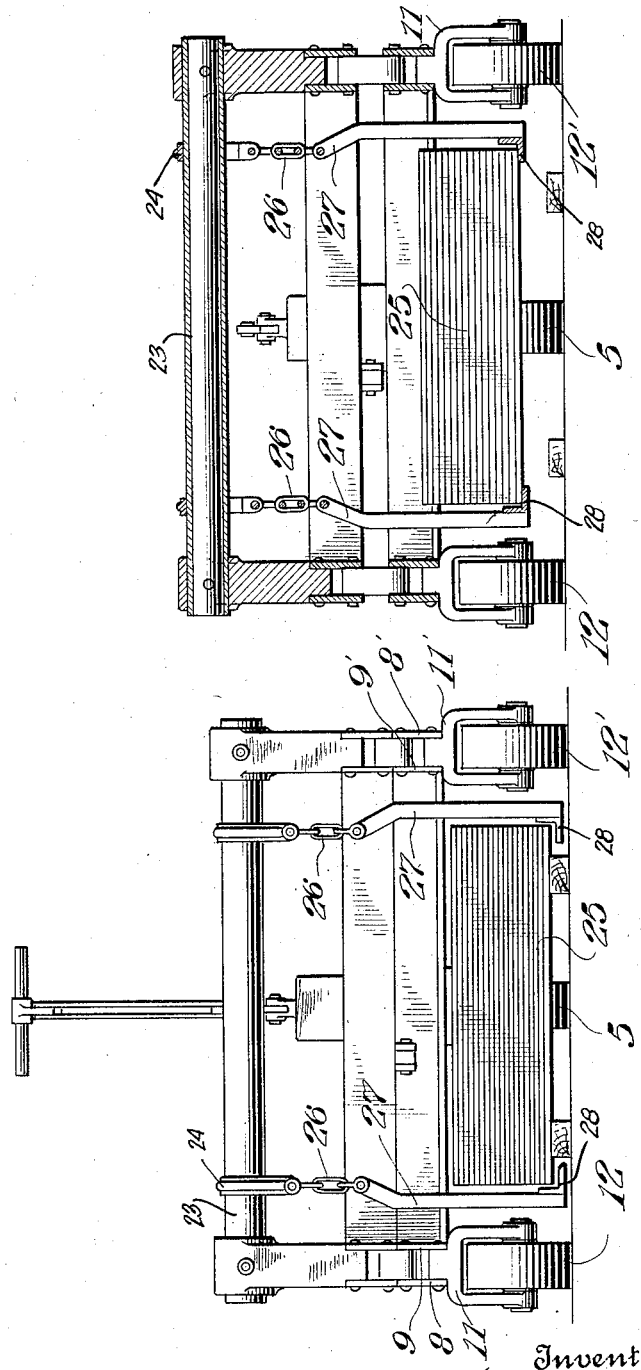

1,849,854

UNITED STATES PATENT OFFICE

WILLIAM STUEBING, JR., OF CINCINNATI, OHIO

LIFTING TRUCK

Application filed April 21, 1928. Serial No. 271,785.

This invention relates to lift trucks. It is an object of the invention to provide a lift truck which shall be adapted for the handling of loads without the use of platforms or skids such as are customarily used in connection with lift trucks of conventional design.

Other objects and advantages of the invention will appear hereinafter.

A preferred embodiment of the invention selected for purposes of illustration is shown in the accompanying drawings, in which, Figure 1 is a top plan view.

Figures 2 and 3 are side elevations showing the truck in lowered and elevated positions respectively.

Figure 4 is a rear end elevation, the truck being in lowered position, and

Figure 5 is a section on the line 5—5 of Figure 3 showing the truck in elevated position.

Referring to the drawings, the truck comprises a chassis frame comprising cross beams 1 and 2 which are spaced apart to receive and support the lift truck head 3 of any suitable design. Preferably the lift mechanism which is enclosed in the head is of the multiple side lift type such as that described and claimed in my copending application, Serial No. 581,724, filed August 14, 1922, and the said head preferably carries a fork 4 upon which is mounted the front steering wheel 5 which supports the front end of the truck.

The ends of the cross bars 1 and 2 on each side of the truck are secured to the connecting plates 6 and 6', which said plates are formed with depending flanges 7 and 7' to which are secured bars 8 and 8' which extend longitudinally of the truck on either side. Extending parallel to the bars 8 and 8' but spaced therefrom are bars 9 and 9' respectively, the forward ends of which are secured to depending flanges 10 and 10' of the plates 6 and 6', and the rear ends of which, together with the rear ends of the bars 8 and 8' are secured to housings 11 and 11'. The said housings carry wheels 12 and 12' which support the rear ends of the chassis frame. As will be observed, there is thus formed a frame of substantial U-shape which is open at its rear end.

Pivotally mounted on the chassis frame and connected thereto by a plurality of links 15 supported between the bars 8 and 9 and 8' and 9' is an upper or elevating frame which is also of substantial U-shape and open at its rear end. The said elevating frame comprises parallel longitudinally extending bar members 16 and 17 and 16' and 17' which are secured at their forward ends to the cross bar 18 which is connected by means of a link 19 to the arm 20 of the lift head. As will be readily understood, said arm 20 is connected to the transmission portion of the lift mechanism within the head 3 and operates in response to repeated downward and upward movements of the steering handle which also connects with said transmission in any suitable or effective manner well known to those skilled in the art, it being unimportant so far as the present invention is concerned in what manner the elevating frame is raised by operation of the steering handle. Secured to the elevating frame between the bars 16 and 17 and 16' and 17' are a plurality of housings 22 and 22' which are adapted to support cross beams 23 which extend transversely across the truck.

Mounted on the cross bars 23 are a plurality of collars 24 which hang loosely on the cross bars in order that they may be easily adjusted laterally on the cross beams in order to support loads of different widths. For purposes of convenience in description, the truck has been illustrated as it may be equipped for the specific purpose of handling stacked sheets of metal such as is designated in the drawings by the reference numeral 25. For this purpose there are secured to the collars 24, by means of links 26, and bar connections 27, the longitudinally extending angle bars 28, the side flanges of which can be readily swung under the pile of sheets as illustrated in Figure 4, and which are adapted to support the same when the lifting mechanism is operated in the usual manner to elevate the upper or elevating frame.

When using the truck in connection with the stacked sheets illustrated herein, the truck may be backed over the load to be lifted in order to straddle the load in the manner illustrated in Figures 4 and 5. The collars 24 may then be adjusted on the cross beams to the proper width for the particular load and the angle bars 28 may be swung beneath the load to engage the same. The lifting mechanism may then be operated to raise the load to the position illustrated in Figures 3 and 5 and the truck may then be moved to any desired position.

When it is desired to use the truck for lifting other loads than the stacked sheets illustrated herein, suitable lifting attachments may be substituted for the bars 27 and 28 herein described, such for example, as ordinary hooks. Large paper rolls may be handled by providing blocks secured to the collars 24 which may be inserted in each end of the core of the paper roll. Other special loads may be readily handled either with such attachments or with other attachments which may be substituted.

It is to be understood that the invention may be variously modified and embodied within the scope of the subjoined claims.

I claim as my invention:

1. A lift truck comprising a chassis frame, an elevating frame mounted thereon, said frames being open on one side to permit the truck to straddle the load to be lifted, and means supported on and adjustable transversely of said elevating frame for engaging a load located within said frame.

2. A lift truck comprising a chassis frame of substantial U-shape, an elevating frame also of substantial U-shape, the open sides of said frames being located at the same side of the truck to permit the truck to straddle the load to be lifted, and means supported on and adjustable transversely of said elevating frame for engaging a load located within said frame.

3. A lift truck comprising a chassis frame, a lift head mounted thereon a steering lever, an elevating frame pivotally mounted on said chassis frame and operatively connected to said steering lever, the elevating frame including spaced bars and cross beams extending therebetween, said frames being open on one side to permit the truck to straddle a load to be lifted, and means supported from said cross beams for engaging a load located within said frame.

4. A lift truck comprising a chassis frame, a lift head mounted thereon, an elevating frame pivotally mounted on said chassis frame and operatively connected to said lift head, said frames being open on one side to permit the truck to straddle a load to be lifted, and means supported on and adjustable transversely of said elevating frame for engaging a load located within said frame.

In testimony whereof, I have signed my name to this specification this 18th day of April, 1928.

WILLIAM STUEBING, Jr.